United States Patent
Swedberg et al.

(10) Patent No.: US 7,012,606 B2
(45) Date of Patent: Mar. 14, 2006

(54) SYSTEM AND METHOD FOR A UNIFIED COMPOSITION ENGINE IN A GRAPHICS PROCESSING SYSTEM

(75) Inventors: Gregory Swedberg, Bellevue, WA (US); Paul David, Kirkland, WA (US); Andrey Arsov, Sammamish, WA (US); Don Curtis, Bellevue, WA (US); Leonardo E. Blanco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 10/692,288

(22) Filed: Oct. 23, 2003

(65) Prior Publication Data

US 2005/0088436 A1    Apr. 28, 2005

(51) Int. Cl.
*G06T 15/70*    (2006.01)

(52) U.S. Cl. .................................................... 345/473
(58) Field of Classification Search ................ 345/419, 345/420, 502, 503, 504, 519, 520, 522, 532, 345/619, 629, 630, 473; 715/509, 514, 516, 715/719, 720, 721, 722, 723, 806, 807, 853, 715/854, 855; 707/100, 102, 104.1
See application file for complete search history.

(56) References Cited

U.S. PATENT DOCUMENTS

2004/0189669 A1 *   9/2004   David et al. ................ 345/619

* cited by examiner

*Primary Examiner*—Kee M. Tung
*Assistant Examiner*—Enrique L. Santiago
(74) *Attorney, Agent, or Firm*—Merchant & Gould P.C.; Joshua W. Korver (57) ABSTRACT

The present invention is directed to a system and method for a unified composition engine that, in general, combines previously separate composition services. The unified composition engine provides a composition service used both in-process in conjunction with application programming interfaces (API's) and on the desktop as the desktop compositor.

22 Claims, 6 Drawing Sheets

SYSTEM AND METHOD FOR A UNIFIED COMPOSITION ENGINE IN A GRAPHICS PROCESSING SYSTEM

CROSS REFERENCE TO RELATED APPLICATIONS

The present invention is related to the following co-pending U.S. patent application Ser. No. 10/184,795 entitled "Multiple-Level Graphics Processing System and Method" filed Jun. 27, 2002; Ser. No. 10/184,796, entitled "Generic Parameterization for a Scene Graph" filed Jun. 27, 2002; Ser. No. 10/185,775, entitled "Intelligent Caching Data Structure for Immediate Mode Graphics" filed Jun. 27, 2002; Ser. No. 10/402,268, entitled "Visual and Scene Graph Interfaces" filed Mar. 27, 2003; Ser. No. 10/401,717, entitled "Markup Language and Object Model for Vector Graphics" filed Mar. 27, 2003; Ser. No. 10/402,322, entitled "System and Method for Managing Visual Structure, Timing, and Animation in a Graphics Processing System" filed Mar. 27, 2003; and an application entitled "Protocol Between the Low-Level Animator and the High-Level Animator," filed concurrently with this application. Each related application is assigned to the assignee of the present patent application and hereby incorporated by reference in its entirety.

BACKGROUND OF THE INVENTION

In contemporary computing systems, the capability of graphics and video hardware is growing at a fast pace. In fact, to an extent, the graphics system in contemporary computing systems may be considered more of a coprocessor than a simple graphics subsystem. At the same time, consumers are expecting more and more quality in displayed images, whether viewing a monitor, television or cellular telephone display, for example.

However, memory and bus speeds have not kept up with the advancements in main processors and/or graphics processors. As a result, the limits of the traditional immediate mode model of accessing graphics on computer systems are being reached. At the same time, developers and consumers are demanding new features and special effects that cannot be met with traditional graphical windowing architectures.

Although certain game programs have been designed to take advantage of the graphics hardware, such game programs operate with different requirements than those of desktop application programs and the like, primarily in that the games do not need to be concerned with other programs that may be concurrently running. Unlike such game programs, applications need to share graphics and other system resources with other applications. They are not, however, generally written in a cooperative, machine-wide sharing model with respect to graphics processing.

For example, performing animation with desktop applications currently requires specialized single-purpose code, or the use of another application. Even then, achieving smooth animation in a multiple windowed environment is difficult if not impossible. In general, this is because accomplishing smooth, high-speed animation requires updating animation parameters and redrawing the scene (which requires traversing and drawing data structures) at a high frame rate, ideally at the hardware refresh rate of the graphics device. However, updating animation parameters and traversing and drawing the data structures that define a scene are generally computationally-intensive. The larger or more animate the scene, the greater the computational requirement, which limits the complexity of a scene that can be animated smoothly.

Compounding the problem is the requirement that each frame of the animation needs to be computed, drawn, and readied for presentation when the graphics hardware performs a display refresh. If the frame is not ready when required by the hardware, the result is a dropped or delayed frame. If enough frames are dropped, there is a noticeable stutter in the animated display. Also, if the frame preparation is not synchronized with the refresh rate, an undesirable effect known as tearing may occur. In practice, contemporary multi-tasking operating systems divide computational resources among the many tasks on the system. However, the amount of time given for frame processing by the operating system task scheduler will rarely align with the graphics hardware frame rate. Consequently, even when sufficient computational resources exist, the animation system may still miss frames due to scheduling problems. For example, an animation task may be scheduled to run too late, or it may get preempted before completing a frame, and not be rescheduled in time to provide a next frame for the next hardware refresh of the screen. These problems get even more complex if the animated graphics need to be composited with video or other sources of asynchronously generated frames.

In general, the previous (e.g., WM_PAINT) model for preparing the frames requires too much data processing to keep up with the refresh rate when complex graphics effects (such as complex animation) are desired. As a result, when complex graphics effects are attempted with conventional models, instead of completing the changes in the next frame that result in the perceived visual effects in time for the next frame, the changes may be added over different frames, causing results that are visually and noticeably undesirable.

A new model for controlling graphics output is described in the aforementioned United States patent applications. This new model provides a number of significant improvements in graphics processing technology. For example, U.S. Ser. No. 10/184,795 is generally directed towards a multiple-level graphics processing system and method, in which a higher-level component (e.g., of an operating system) performs computationally intensive aspects of building a scene graph, updating animation parameters and traversing the scene graph's data structures, at a relatively low operating rate, in order to pass simplified data structures and/or graphics commands to a low-level desktop composition component. Because the high-level processing greatly simplifies the data, the low-level component can operate at a faster rate, (relative to the high-level component), such as a rate that corresponds to the frame refresh rate of the graphics subsystem, to process the data into constant output data for the graphics subsystem. While the above improvements provide substantial benefits in graphics processing technology, certain improvements are yet to be realized.

SUMMARY OF THE INVENTION

Briefly, the present invention provides a system and method for a unified composition engine that, in general, combines previously separate composition services. The unified composition engine provides a composition service used both in-process in conjunction with application programming interfaces (API's) and on the desktop as the desktop compositor. The unified composition engine combines the efforts of two previous composition efforts: API composition engine intended for in process utilization to compose the content of a single application; and the desktop composition engine intended to compose the all of the windows to create the final display. The desktop composition engine and API composition engine have different roles and usage scenarios. The desktop composition engine is used to compose the content rendered by other processes, render a minimum of its own content to implement the window frame; and coordinate tightly with the legacy window manager (e.g., User32). The API composition engine is used to control rendering and compose all of the content for a single application and provide a mechanism for efficient remoting. Recent changes in usage requirements for the API composition engine and the desktop composition engine resulted in the API composition engine being required to host content from other processes and legacy child windows, and for the desktop composition engine to remote the window frame. Combining the two composition efforts reduces code duplication, improves test coverage and simplifies enabling features like legacy window interoperability, remoting, and Multiple Document Interfacing (MDI), that were complicated otherwise.

DETAILED DESCRIPTION OF THE PREFERRED EMBODIMENT

The present invention is substantially directed at a system and method for a Unified Composition Engine (UCE). The invention provides a method for composing a graphics output at both the application level and the desktop level, substantially reducing code duplication.

The following description is divided into three parts. The first part of the description describes an illustrative computing environment in which the present invention may operate. The second part of the description describes an illustrative graphics architecture. The third part of the description describes one illustrative implementation of the present invention.

Illustrative Computing Environment

Figure 1:
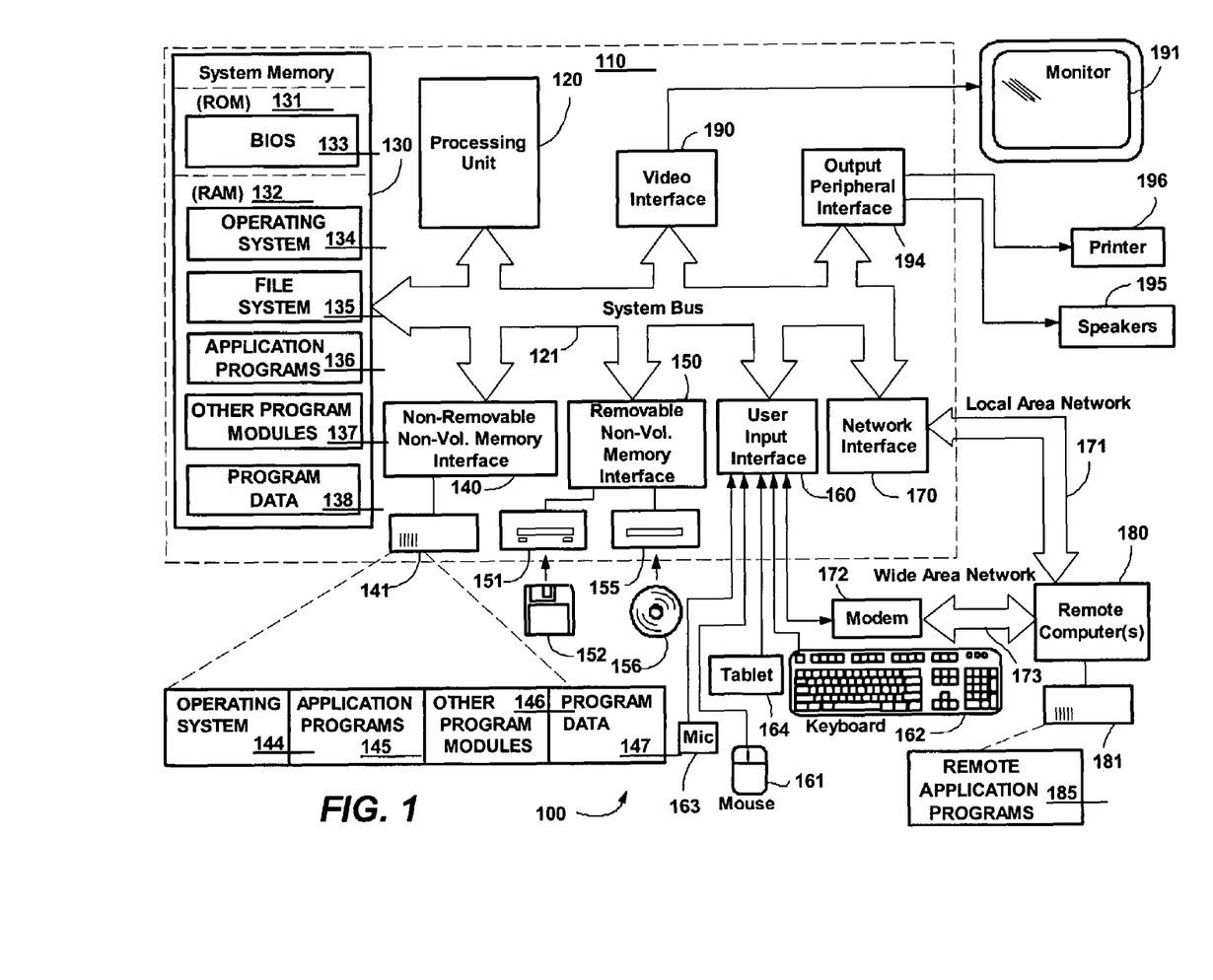
FIG. 1 illustrates an exemplary computing device that may be used in illustrative implementations of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Illustrative Graphics Architecture

In one described implementation, the present invention is generally incorporated into a media integration layer stack, into which an application program, the desktop system, or the like submits various data to a high level visual system, such as by directly making calls to a visual API layer or providing markup that is interpreted into calls to the visual API layer. The visual system constructs a hierarchical scene graph based on the data submitted to it, and at some rendering time, processes the scene graph into commands and other data and asynchronously communicates with a compositor service in the stack to process those commands and other data into its own retained data structure. A lower-level compositor system may combine communications from possibly multiple visual systems (clients) into graphics commands that are understood by a graphics subsystem, and animation commands or intervals modifying portions of the retained graphics data. The lower-level compositor system provides those graphics commands to the graphics subsystem at a rate that corresponds (e.g., is at or near) the refresh rate of the graphics hardware.

One aspect of the present invention is generally directed to receiving and processing program code-initiated drawing instructions and other information (e.g., image bitmaps), in order to render graphical output on the system display. To this end, the present invention provides a system and method implemented in various components, data structures and a communications protocol, which together enable a higher-level composition engine, e.g., in a user interface thread and rendering thread associated with the visual system, to provide data to a lower-level animation and compositing engine, or compositor. The visual system provides functions (e.g., application programming interfaces, or APIs) to application programs and the like to enable those programs to populate a scene graph with data structures, drawing primitives (commands), and other graphics-related data.

Figure 2:
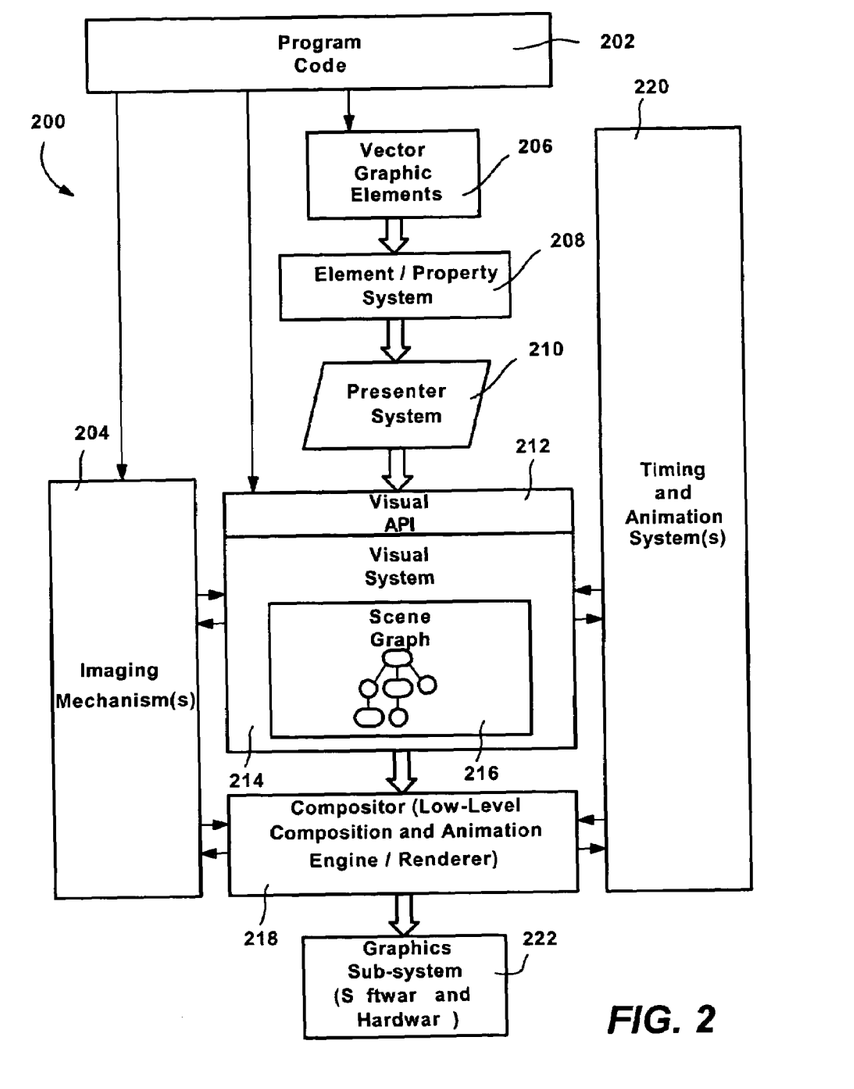
FIG. 2 represents a general, layered architecture for an API composition engine in accordance with the present invention

FIG. 2 represents a general, layered architecture 200 for an API composition engine. As represented in FIG. 2, program code 202 (e.g., an application program or operating system component or the like) may be developed to output graphics data in one or more various ways, including via imaging 204, via vector graphic elements 206, and/or via function/method calls placed directly to a visual application programming interface (API) layer 212. The use of vector graphic elements is described in the aforementioned patent application entitled "Markup Language and Object Model for Vector Graphics," while direct interaction with the API layer is further described in the aforementioned co-pending patent application entitled "Visual and Scene Graph Interfaces."

In general, the imaging mechanism 204 provides the program code 202 with a mechanism for loading, editing and saving images, e.g., bitmaps. These images may be used by other parts of the system, and there is also a way to use the primitive drawing code to draw to an image directly. Vector graphics elements 206 provide another way to draw graphics, consistent with the visual system's object model. Vector graphic elements 206 may be created via a markup language, which an element/property system 208 and presenter system 210 processes to make appropriate calls to the visual API layer 212. In general the vector graphic elements 206 are parsed into objects of the object model from which a scene graph is drawn, which may be provided to the scene graph via an element level via the element/property system 208 and presenter system 210, or may be provided in a more efficient manner at a resource level.

In one implementation, the graphics layer architecture 200 includes a visual system 214, which includes or is otherwise associated with a scene graph 216 comprising hierarchically-arranged objects, constructed via direct or indirect calls to the visual API 212. In general, the scene graph models the structural qualities and specific rendering data generated by the API calls, and also provides a set of read services or properties for the application to query. In general, the visual API layer 212 provides the program code (and the presenter system) with an interface to the scene graph 216, including the ability to create objects, open and close objects to provide data to them, and so forth. In other words, the visual system 214 exposes a unified media API layer 212 by which developers may express intentions about graphics and media to display graphics information, and provide an underlying platform with enough information such that the platform can optimize the use of the hardware for the program code. For example, the underlying platform will be responsible for caching, resource negotiation and media integration.

In accordance with an aspect of the present invention and as described below, the visual system 214 acts as a client of the compositor (lower-level composition and animation engine) 218, and communicates appropriate data to the compositor such that the desired frame is rendered. In general, the visual system 214 includes a user interface component that typically performs more computationally-expensive operations than the compositor 218, and thus this aspect of the visual system 214 typically operates at a relatively slower rate with respect to the operating rate of the compositor. Note that as used herein, the terms "high-level" and "low-level" are similar to those used in other computing scenarios, wherein in general, the lower a software component relative to higher components, the closer the component is to the hardware. Thus, for example, graphics information sent from the visual system's high-level composition and animation engine code may be received at the low-level desktop compositing and animation engine, where the information is used to send graphics data to the graphics subsystem 222 including the hardware.

In accordance with an aspect of the present invention, the visual system 212 (asynchronously) communicates various information such as scene change data, instructions such as animation function data and possibly other data (e.g., pointers to bitmaps) that is processed by a rendering thread into data provided to the compositor 218. In other words, the visual system 212 includes a user interface thread and rendering thread that build on a lower-level composition system 218, shared across multiple desktop applications, as described below. This lower-level composition system 218 matches the device refresh rate, and resides in a process distinct from the applications which send it content. This decoupling from the individual client (applications') visual systems permits the expense of an individual application animation to be properly adjudged and handled by the system scheduler. Further, the application-resident composition engine (thread) may group its dedicated thread to a category that is common to like application-resident composition threads. For example, using a CPU scheduling reserve system, an upper and lower bound for CPU percentage consumption may be applied to the applications executing on the system.

As described below, the visual system 214 integrates with the timing and animation systems 220 to provide declarative (or other) animation control (e.g., animation functions, intervals and other parameters) and timing control. Note that the animation system allows animate values to be passed essentially anywhere in the system, including, for example, at the element property level, inside of the visual API layer 212, and in any of the other resources. The timing system is exposed at the element and visual levels.

The compositor 218 manages the composing, animating and rendering of the scene, which is then provided to the graphics subsystem 222. In one implementation, the visual system includes a user interface thread that works in conjunction with a second thread (in the same process) that provides animation and composition functionality. Thus, there is a composition component in each visual system that is decoupled from the composition components (in a different process) that implement the rendering of graphics from the scenes of multiple applications. Note, that at times it is advantageous for some of the rendering to happen at higher levels, e.g., while the lower layers service requests from multiple applications, the visual systems are instantiated on a per-application basis, whereby is possible via the imaging mechanisms to perform time-consuming or application-specific rendering at higher levels, and pass references to a bitmap to the compositor 218.

It is the lower-level composition described above for the API composition engine that is now shared between both the API composition engine and the desktop composition engine. Combining the lower-level composition for the both the API composition engine and the desktop composition engine results in the unified composition engine of the present invention. The unified composition engine effects the resource management for both the API composition engine and the desktop composition engine to produce scenes for display, as described below in the discussion of the illustrative implementation.

Figure 3:
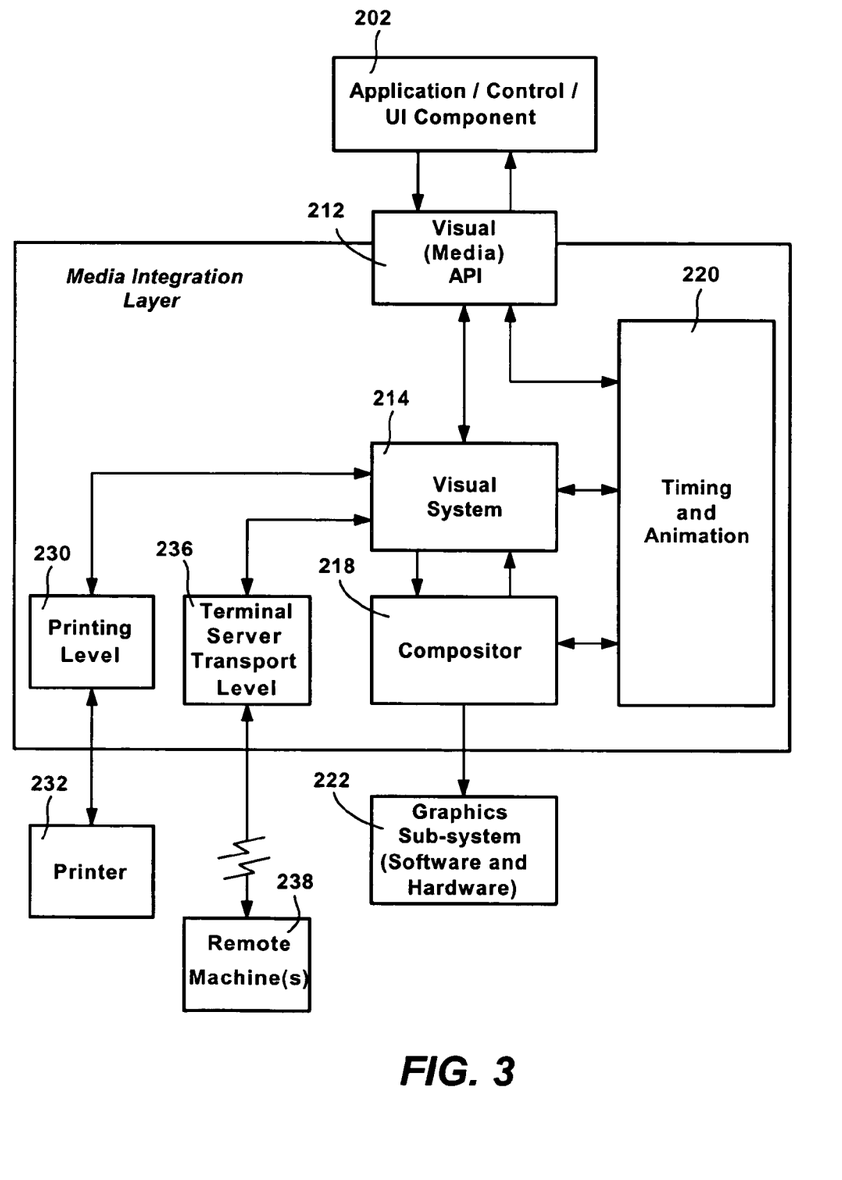
FIG. 3 is a block diagram representing a media integration layer architecture into which the present invention may be incorporated.

As represented in FIG. 3, alternatively or in addition to locally displayed output, the compositor 218 (or one similar thereto) may provide the rendering and animation instructions in an appropriate format to lower-level printing code 230 for sending fixed image data to a printer 232 or the like, and/or may provide rendering instructions and simple animation intervals in an appropriate format to a lower-level terminal transport server 236 for transmission to remote machines 238. Note that richer information also may be passed across the network, e.g., it may be desirable to have the remote machine handle mouse rollover effects locally, without any network traffic.

Illustrative Implementation

Figure 4:
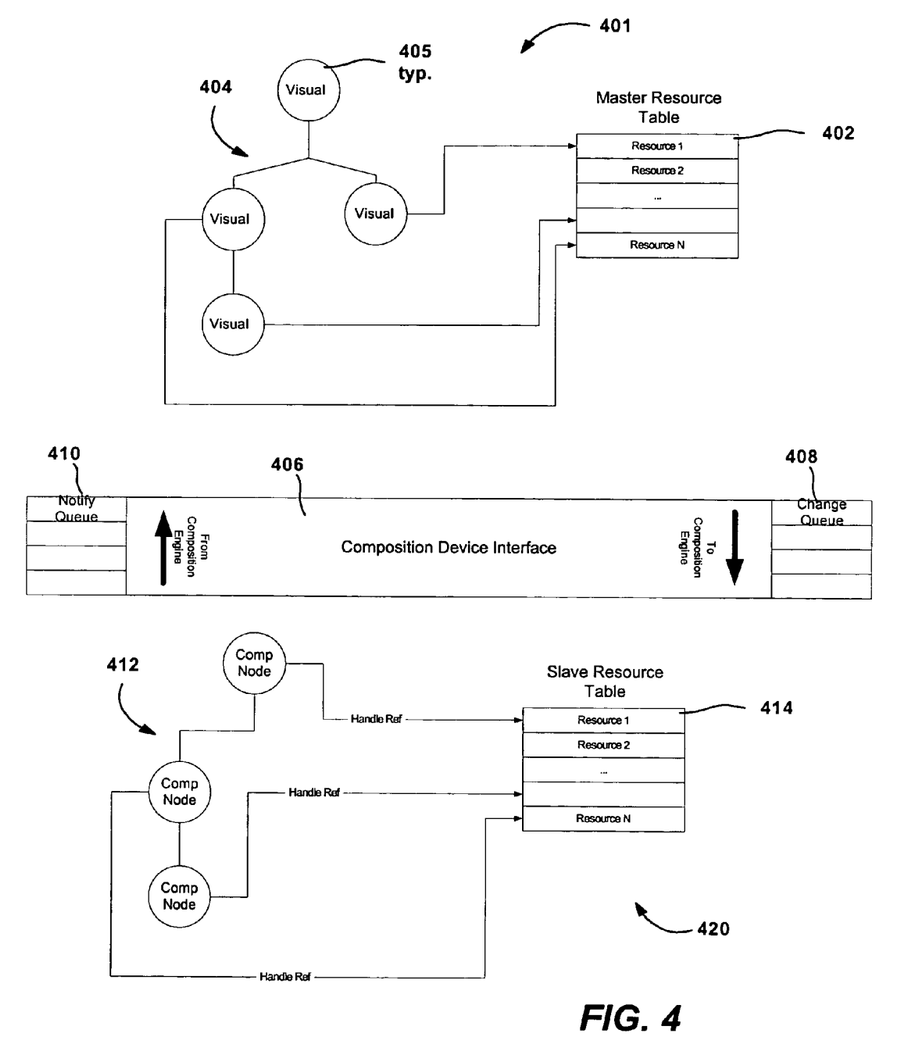
FIG. 4 illustrates an overview architecture for utilizing a unified composition engine in accordance with the present invention.

FIG. 4 illustrates an overview architecture for utilizing a unified composition engine in accordance with the present invention. The unified composition engine architecture includes a master resource table 402, visual tree 404, composition device interface 406, change queue 408, notify queue 410, composition tree 412, and slave resource table 414.

The unified composition engine architecture is logically separated into two layers: the top layer, or client layer 401 (i.e., visual system), includes the visual tree 404 (i.e., hierarchical data structure) which is the primary client of the unified composition engine and the lower layer is the unified composition engine proper 420. The visual tree 404 provides the interaction between the unified composition engine with its main client and the interaction between the resource tables (e.g., 402, 414) maintained by the client and the unified composition engine.

In accordance with the present invention, the visual tree 404 may be replaced with the desktop window manager as the client for the unified composition engine 420. The desktop window manager is the client when the unified composition engine 420 is used as the desktop composition engine. the same library is now executing the same compositions for when the visual tree 404 and the desktop window manager is the client of the unified composition engine 420. Different processing run for the application's visual tree and the desktop window manager, and they each handle different data (i.e., the payload varies), but the protocol for unified composition engine 420 remains constant. In one embodiment, the protocols for use with the desktop window manager comprise a functional subset of the protocols available when an application is the client.

As an example, interaction between the client layer 401 and the unified composition engine 420, as well as resource management, is described below for the situation when an application is a client. The visual tree 404 represents the application's or document's representation of a scene to be displayed. This scene may be very large, and possibly much larger than what is currently visible. The contents of each visual (e.g., 405) are defined by a list of rendering instructions, or RenderData, and the resources it uses such as geometry, points, pens, brush, images, etc. These resources are managed by the master resource table 402 which contains device and resolution independent data for each resource and in some cases a collection or resource dependent forms. The master resource table 402 is responsible for managing the lifetime of resources (e.g., via reference counting).

No information about a visual tree (e.g., 404) or resources is transmitted to the unified composition engine 420 until the visual tree is to be displayed. When a visual tree (e.g., 404) is associated with a render target, the visual tree sends a representation of that tree, along with the appropriate resources to the unified composition engine 420. The communication is asynchronous via the change queue 408 of the composition device interface 406. Only the potentially visible subset of visual tree 404, referred to herein collectively as composition tree 412 (i.e., compositor data structure), are represented in the unified composition engine 420. A visual tree is displayed when it is connected to a known resolution render target. Therefore, the full transformation from object to render target space is known for the client.

The resources sent to the unified composition engine 420 are directly realizable by the unified composition engine 420 without callback or the required realization is sent. Resources like "Text" and "Images" are expensive (in terms of processing overhead) to realize and are therefore converted to the appropriate "ready-to-render" form in the visual tree 404. Converting the resources to a form that may be readily rendered conserves overhead for composition in the unified composition engine 420. Resources are also realized in the visual tree 404 if they require any callbacks to user code. Other resources like "Geometry" that may be tessellated efficiently by the unified composition engine 420 to the correct resolution when needed are realized by the unified composition engine 420 itself.

The unified composition engine 420 manages resources in the slave resource table 414. In one embodiment, the slave resource table 414 does not perform reference counting of any form so as to increase performance. This is possible because slave resource table 414 resources are accessed on the single composition thread for a composition device. In one embodiment, all resources in the slave resource table 414 also exist in the master resource table 402. The master resource table 402 explicitly controls the lifetime of slave resource table 414 resources via serialized change queue 408 requests. The unified composition engine 420 refers to resources by handle. In one embodiment, if resource lookup fails, the unified composition engine 420 posts a message to the notification queue 410 and simply skips the processing requiring that resource. The unified composition engine 420 runs as a single thread and runs in a constant composition loop.

One aspect of the present invention for the unified composition architecture shown, is the architecture's use of resources. A resource may be defined as "any object needed for rendering a scene that requires different realizations for different resolutions and/or physical devices; that is used multiple times within a composition tree; or that may change independently of its users such as via animation." Resources are represented in the unified composition engine 420 and at the client layer 401 as records in a table (e.g., master resource table 402), and are referred to by handle. Objects that use the resource do so by handle. The handle can be looked up in the resource table (e.g., master resource table 402), to get a pointer to the actual object. Resources are able to serialize themselves, apply updates, and provide a realization for a particular resolution and device.

Resources are generally separated into a few types, such as drawing resources, value resources, and structural resources. Drawing resources are objects defined by the rendering layer and may be consumed directly by that layer. Examples of drawing resources include RenderData, Bitmap, Image, Glyphrun, Geometry, and Brush. Drawing resources can be further divided into simple and complex categories.

Drawing resources with very low and constant rendering cost can be realized during composition directly from the device and resolution independent source data. Geometry is a simple drawing resource because it can be tessellated to the final required resolution efficiently in the composition loop of the unified composition engine 420. In contrast, complex drawing resources require complex computations, call backs to user code, or input/output to generate realizations. In one embodiment, complex drawing resources are not realized by the unified composition engine 420. Instead, the appropriate realizations are provided at the client layer 401 in advance to composition. "Image" is an example of a complex resource. Images are read from disk, decoded, sampled at the appropriate resolution and filtered.

Value resources represent a simple changeable or animate value used by another resource. Examples of value resources are Double, Point, Color, and Transform. For example, a RenderData resource may refer to a Point resource to draw a line where one of the points is expected to change via animation or imperative direction by the application. Value resources may be static or animate. If the value resource is animate, the value resource contains animation interval data defining how the value changes with time.

Structure resources are objects that play a role in the composition process but are not directly part of rendering. These objects are implemented as resources so that they may participate in updates via the change queue and use Value Resources to update internal values. Some currently identified structure resources include Composition Node and Render Targets.

In general, resources must be realized before they can be used. A realization may be referred to as "a representation of a resource that is appropriate for a given resolution and is ready for use by a specific device." An example of a realization is a geometry tessellated into triangles for a particular resolution and transformation and potentially already loaded into a vertex buffer on the video card. Realizations are either created on demand in the unified composition engine 420 or are created at the client layer 401 and sent to the unified composition engine 420. If a resource realization that is required cannot be found or created a notification is queued via the notify queue 410 to the client level 401. The notification indicates the resource handle, the transform, and the device needed, along with any transform of the realization used.

Equally important to the resources themselves is how they are managed. Resources have some potentially contradictory requirements: efficient lifetime management so resources are eliminated as soon as possible; efficient memory storage since they may be large; multi-thread safe handle processing; robust code that functions even if expected resources are missing; and efficient lookup of realizations to ensure smooth composition. The unified composition engine architecture shown allows the requirements to be split into two sets, with the master resource table 402 meeting a first of the requirements and the slave resource table 414 meeting the second set of requirements.

The master resource table 402 is fully reference counted for safe efficient memory management and synchronized to be thread-safe. Reference counting refers to the number of time a particular resource is utilized. In contrast, the slave resource table 414 runs on a single thread and utilizes a reference and lock free design.

The master resource table 402 manages all of the resources used within the client layer 401 application. The master resource table 402 is responsible for giving out handles; reference counting handle records, resources and realizations; sending resources to the slave resource table 414 and controlling the lifetime of the slave resource table 414 resources. The master resource table 402 may manage tens of thousands of objects, most of which are not currently being displayed, however the visual tree 404 does not create the resource until it utilized for display. When the visual tree 404 is displayed, the visual tree 404 is walked and the necessary resources are sent to the unified composition engine 420 where they are managed in the slave resource table 414. When a particular resource is no longer required for composition, the visual tree 404 communicates to the composition device (e.g., 218 of FIG. 2) to delete the resource. If an application is multicast to multiple viewers, the visual tree 404 sends the same information to multiple composition devices. The master resource table 412 tracks which composition devices hold a representation of each resource.

In one aspect of the present invention, the resource data is shared between the client layer 401 and the unified composition engine 420. The resource data may be shared when the shared data is classified "read-only" once created, the shared data is complete before "copying" to the unified composition engine 420, the visual tree 404 controls the lifetime of the shared data, and the unified composition engine 420 object is deleted first by an explicit request from the visual tree 404. This set of requirements ensures that data in the slave resource table 414 remains in a state consistent with the master resource table 402.

Figure 5:
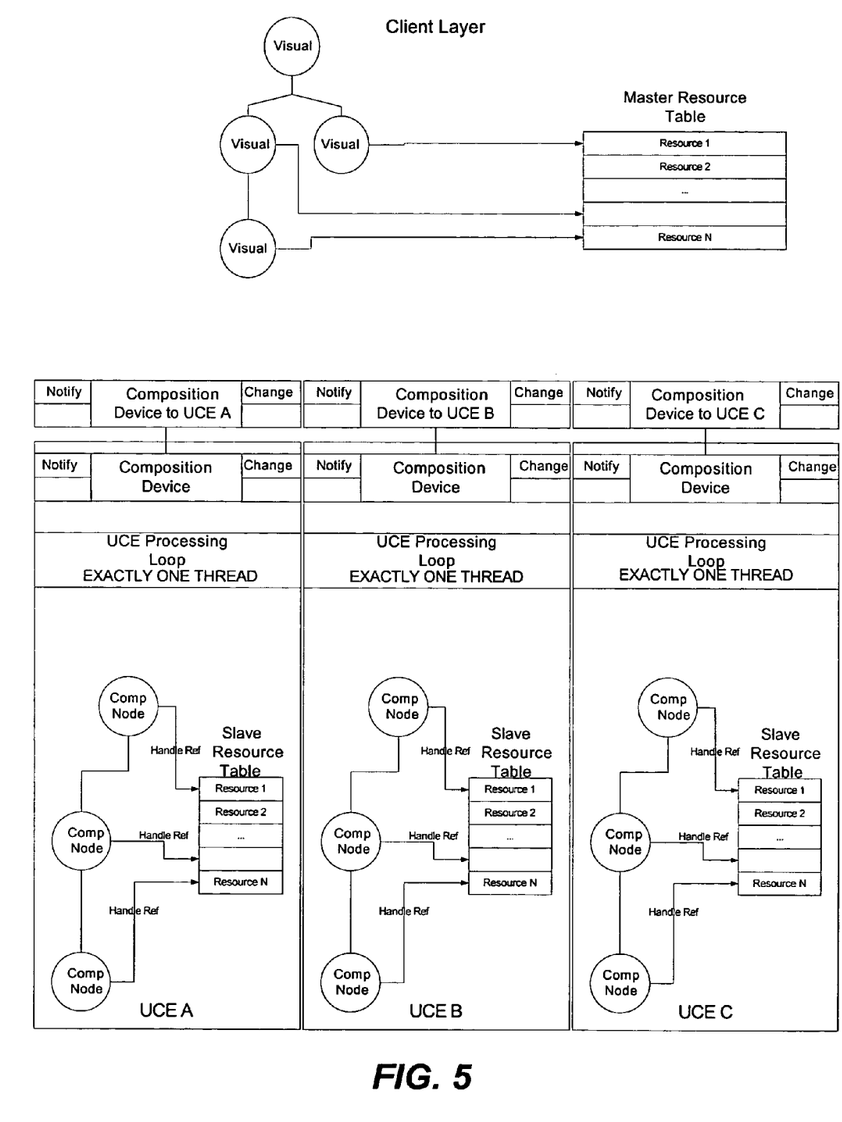
FIG. 5 illustrates an overview architecture for multiple unified composition engines for a single application domain in accordance with the present invention.

FIG. 5 illustrates an overview architecture for multiple unified composition engines (UCEs) for a single application domain in accordance with the present invention. This architecture includes a single application domain at the client layer, but multiple unified composition engines for composing the scene in conjunction with the application. A logical composition device (e.g., composition device to UCE C) defines a connection between the application (i.e., composition client) and each of the multiple unified composition engines. An example of when this architecture may be used is in the event of remote assistance or other situations where a single application is displayed on more than one machine over a network. The number of unified composition engines that may be used in conjunction with a single application domain are not limited to the three shown, but may be any number as desired.

Figure 6:
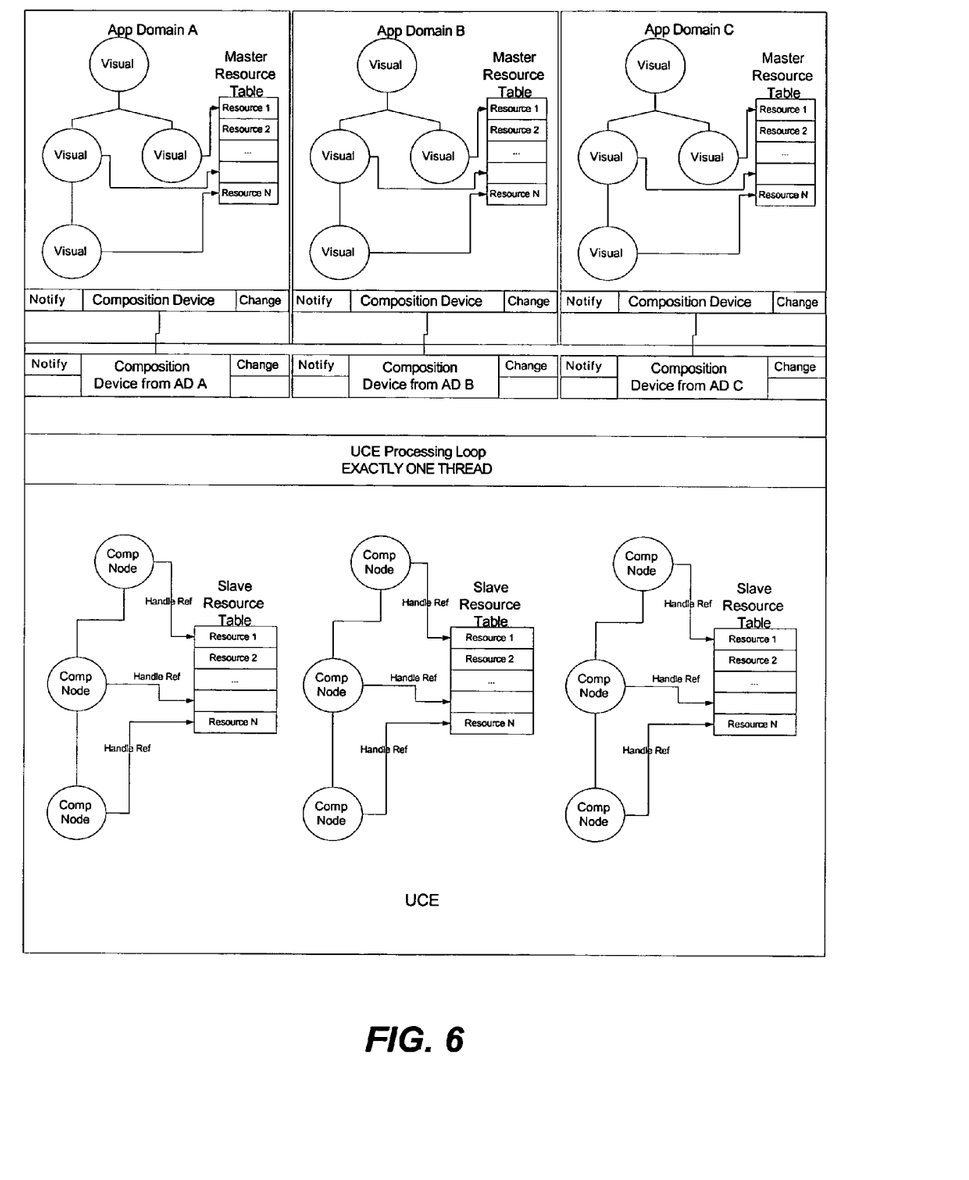
FIG. 6 illustrates an overview architecture for multiple application domains for a single unified composition engine in accordance with the present invention.

FIG. 6 illustrates an overview architecture for multiple application domains for a single unified composition engine in accordance with the present invention. This architecture includes a multiple application domains at the client layer, but a single unified composition engine for composing the scene in conjunction with the multiple applications. A logical composition device (e.g., composition device to UCE C) defines a connection between each of the applications (i.e., composition clients) and the unified composition engine. An example of when this architecture may be used is in the event of multiple applications on a single computing device that are required to each have their own domain. The number of application domains that may be used in conjunction with a single unified composition engine are not limited to the three shown, but may be any number as desired.

The above specification, examples and data provide a complete description of the manufacture and use of the composition of the invention. Since many embodiments of the invention can be made without departing from the spirit and scope of the invention, the invention resides in the claims hereinafter appended.

We claim:

1. In a computing environment, a system comprising:
   a visual system, the visual system being configured to receive calls from both a program and a window desktop manager to construct a hierarchical data structure, wherein the hierarchical data structure corresponds to one of the program and the window desktop manager;
a unified composition engine, the unified composition engine receiving commands from the visual system, wherein the unified composition engine constructs a compositor data structure in response to the commands to provide graphics output, wherein the compositor data structure correspond to the hierarchical data structure constructed by the visual system;
a change queue that is configured to pass the commands from the visual system to the unified composition engine; and
a notify queue that is configured to pass requests and notifications from the unified composition engine to the visual system.

2. The system of claim 1, wherein the unified composition engine comprises a first composition service decoupled from a second composition service, the first composition service incorporated into the visual system, and configured to provide data to the second composition service.

3. The system of claim 1, further comprising:
a master resource table included in the visual system, wherein the master resource table comprises a first list of resource used by one of the application and the desktop window manager; and
a slave resource table included in the unified composition engine, wherein the slave resource table includes a second list of resources provided to the unified composition engine, the slave resource table being managed by the master resource table.

4. The system of claim 3, wherein the second list of resources is an inclusive list of resources when compared to the first list of resources.

5. The system of claim 3, wherein the master resource table is responsible for giving out handles, reference counting handle records, resources and realizations, sending resources to the slave resource, and controlling the lifetime of the slave resource table resources.

6. The system of claim 3, wherein the master resource table explicitly controls the lifetime of slave resource table resources via serialized requests.

7. The system of claim 1, wherein the same library is executing the same compositions when the unified composition engine operates in response to the desktop window manager and when the unified composition engine operates in response to a program.

8. The system of claim 1, wherein protocols for use by the unified composition engine when responsive to the desktop window manager comprise a functional subset of the protocols for use by the unified composition engine when responsive to the program.

9. The system of claim 1, wherein the slave resource table resources are accessed on a single composition thread.

10. The system of claim 1, wherein the unified composition engine runs as a single thread and runs in a constant composition loop.

11. The system of claim 1, further comprising additional visual systems that communicate to the unified composition engine such that the graphics output corresponds to the visual systems.

12. The system of claim 1, further comprising additional unified composition engines that communicate to the visual system such that multiple graphics outputs are produces that correspond to the visual system.

13. In a computing system, a method comprising:
receiving calls from both a program and a desktop window manager, wherein a hierarchical scene structure is constructed by a visual system in response to the calls such that the hierarchical scene structure correspond to one of the program and the desktop window manager;
communicating information that represents changes to the hierarchical data structure to a unified composition engine;
communication a set resources to the unified composition engine, wherein the set of resources correspond to a master resource table that is related to the hierarchical data structure;
updating information in the compositor data structure based on the communicated information;
updating a slave resource table based on the communicated set of resources, wherein the slave resource table is related to the compositor data structure;
processing the compositor data structure to output graphics information; and
passing queued request and notifications from the unified composition engine to the visual system.

14. The method of claim 13, wherein constructing the hierarchical scene structure process is asynchronously performed in comparison to the processing of the compositor data structure to produce the output graphics information.

15. The method of claim 13, wherein the slave resource table comprises a list of resources that is an inclusive list of resources when compared to the master resource table.

16. The method of claim 13, further comprising controlling the lifetime of the slave resource table resources in response to the master resource table.

17. The method of claim 13, further comprising executing compositions using the unified composition engine according to a first library when the unified composition engine operates in response to the desktop window manager and executing compositions using the unified composition engine according to the first library when the unified composition engine operates in response to a program.

18. The method of claim 13, wherein protocols for use by the unified composition engine when responsive to the desktop window manager comprise a functional subset of the protocols for use by the unified composition engine when responsive to the program.

19. The method of claim 13, further comprising accessing the slave resource table resources on a single composition thread.

20. The method of claim 13, further comprising running the unified composition engine as a single thread and in a constant composition loop.

21. The method of claim 13, further comprising communicating additional information and additional sets of resources to the unified composition engine such that the graphics output information corresponds to additional programs.

22. The method of claim 13, further comprising communicating the information and set of resources to multiple unified composition engines such that multiple graphics output information is produced that corresponds to the one of program and desktop window manager.

* * * * *

UNITED STATES PATENT AND TRADEMARK OFFICE
CERTIFICATE OF CORRECTION

PATENT NO. : 7,012,606 B2 Page 1 of 1
APPLICATION NO. : 10/692288
DATED : March 14, 2006
INVENTOR(S) : Gregory Swedberg et al.

It is certified that error appears in the above-identified patent and that said Letters Patent is hereby corrected as shown below:

In the Drawings
On Sheet 2 of 6, Fig. 2 (Box 222), line 3, delete "S ftwar" and insert -- Software --, therefor.

On Sheet 2 of 6, Fig. 2 (Box 222), line 4, delete "Hardwar" and insert -- Hardware --, therefor.

In column 1, line 10, delete "application" and insert -- applications --, therefor.

In column 3, line 30, after "invention" insert -- . --.

In column 6, line 43, delete "high level" and insert -- high-level --, therefor.

In column 7, line(s) 20-21, delete "Interfaces.""" and insert -- Interfaces". --, therefor.

In column 9, line 39, after "engine." delete "the" and insert -- The --, therefor.

In column 13, line 10, in Claim 1, delete "correspond" and insert -- corresponds --, therefor.

In column 14, line 7, in Claim 13, delete "correspond" and insert -- corresponds --, therefor.

In column 14, line 23, in Claim 13, delete "request" and insert -- requests --, therefor.

Signed and Sealed this

Twenty-eighth Day of July, 2009

JOHN DOLL
*Acting Director of the United States Patent and Trademark Office*